United States Patent
Billingsley

[11] 3,760,516
[45] Sept. 25, 1973

[54] VEHICLE SNOWPLOW WITH THREE-POINT QUICK CONNECT HITCH

[76] Inventor: James E. Billingsley, P.O. Box 72, Prairie, Iowa

[22] Filed: Mar. 16, 1971

[21] Appl. No.: 124,833

[52] U.S. Cl. ................. 37/42 R, 37/50, 280/503
[51] Int. Cl. ............................................. E01h 5/00
[58] Field of Search ............ 37/41, 42 R, 42 VL, 37/50, 44, 46, 47, 48, 49; 280/503, 116, 504

[56] References Cited
UNITED STATES PATENTS

| | | | |
|---|---|---|---|
| 1,422,928 | 7/1922 | Colling | 280/503 X |
| 2,391,608 | 12/1945 | Wood | 280/503 X |
| 2,710,464 | 6/1955 | Husting | 37/42 R |
| 2,730,378 | 1/1956 | Fergason | 280/503 X |
| 3,448,534 | 6/1969 | Pipes et al. | 37/44 |
| 3,608,216 | 9/1971 | Prescott | 37/42 R |
| 1,550,780 | 8/1925 | Cerasoli | 37/42 R |
| 1,473,890 | 11/1923 | Toy et al. | 37/41 UX |
| 2,061,585 | 11/1936 | Meyer | 37/42 R |
| 1,918,771 | 8/1933 | Meyer | 37/42 R |
| 1,794,822 | 3/1931 | Barker | 37/42 R |
| 2,264,368 | 12/1941 | Gettleman | 37/42 R |
| 1,624,809 | 4/1927 | Sewell | 37/42 R |

Primary Examiner—Robert E. Pulfrey
Assistant Examiner—R. E. Suter
Attorney—Zarley, McKee & Thomte

[57] ABSTRACT

A snowplow for use on the rear axle of a vehicle comprising first and second arms having the forward ends thereof detachably secured to the rear axle with the rearward ends thereof being positioned rearwardly of the rearward end of the vehicle. A snowplow blade is secured to the rearward ends of the first and second arms and may be angled with respect to the vehicle by means of an extension which may be secured to either of the arms. The snowplow blade is connected to the vehicle trailer hitch by means of a connection means which is also connected to the extension means for reinforcement. The snowplow blade is hingedly secured at its upper end to the connection means so that forward movement of the vehicle will cause the blade to hingedly pivot so that less snow is pulled forwardly. The snowplow is used by simply backing the vehicle from its garage so that a path is cleared behind the vehicle.

9 Claims, 5 Drawing Figures

PATENTED SEP 25 1973
3,760,516
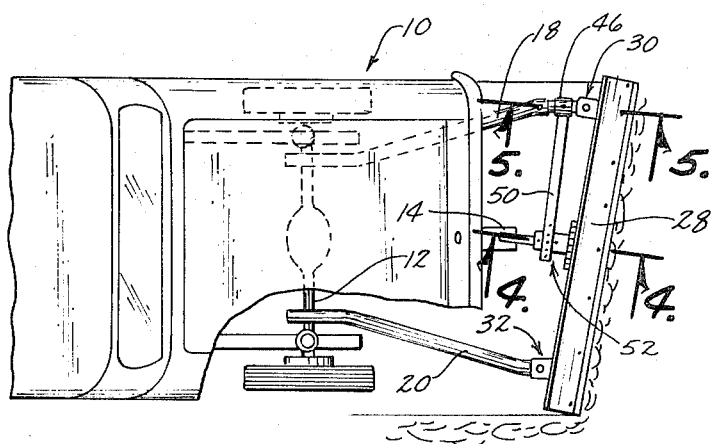
Fig. 1
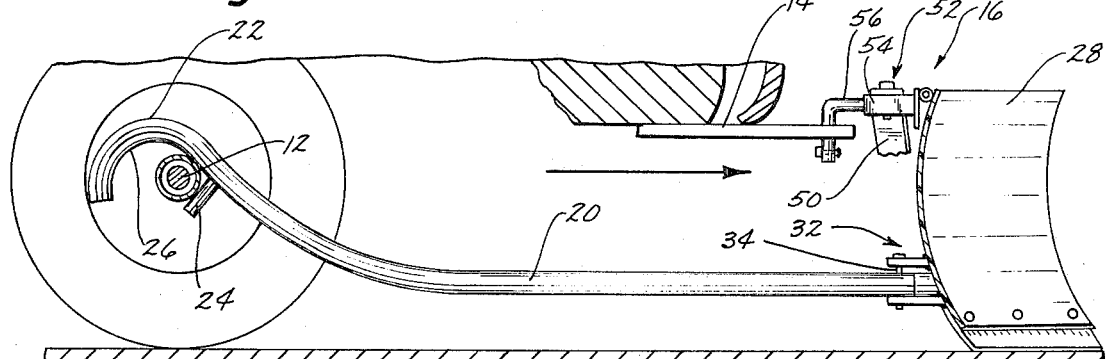
Fig. 2
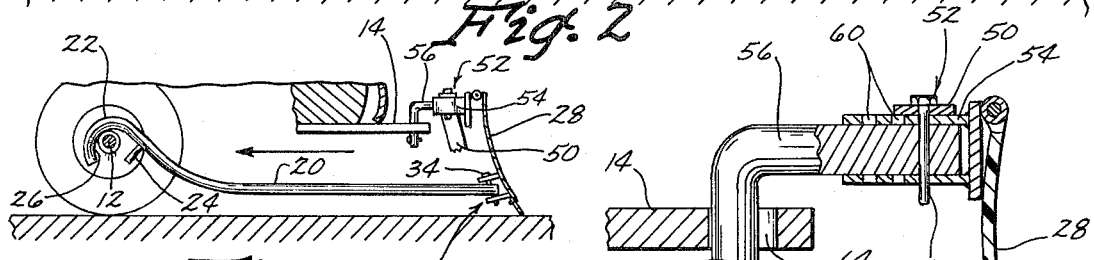
Fig. 3
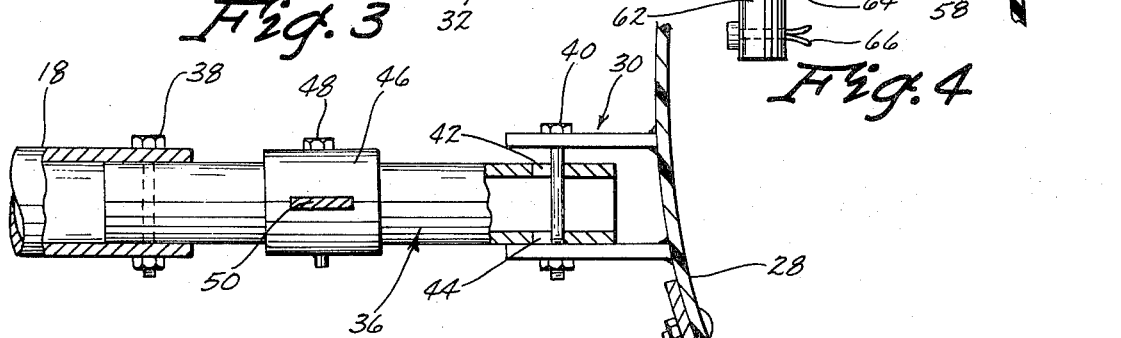
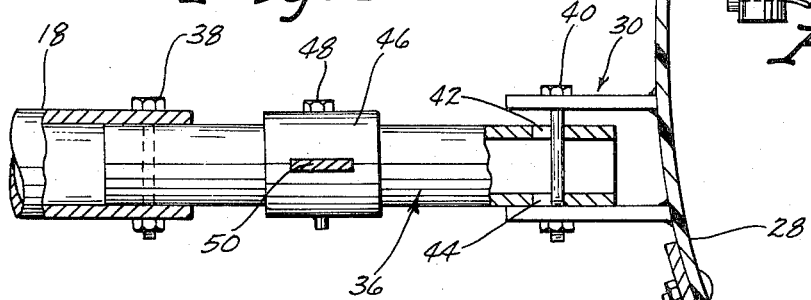
Fig. 5
INVENTOR
JAMES E. BILLINGSLEY
BY
Zarley, McKee & Thomte
ATTORNEYS

VEHICLE SNOWPLOW WITH THREE-POINT QUICK CONNECT HITCH

Conventional snowplow blades are usually secured to the forward end of vehicles. Vehicles are usually driven forwardly into the garage which makes it impossible to plow the snow that may accumulate behind the vehicle while the vehicle is in the garage.

Therefore, it is a principal object of this invention to provide a snowplow for use on the rear axle of an automobile.

A further object of this invention is to provide a snowplow for use on the rear end of an automobile which may be quickly secured thereto.

A further object of this invention is to provide a snowplow which permits the vehicle to plow snow as the vehicle is backed from its garage.

A further object of this invention is to provide a snowplow for use on the rear axle of an automobile including means to permit the blade to be selectively angled with respect to the direction of travel of the vehicle.

A further object of this invention is to provide a snowplow for use on the rear axle of an automobile having means thereon to permit the blade to pivot to a semi-inoperative position when the vehicle is moved forwardly.

A further object of this invention is to provide a snowplow for use on the rear axle of an automobile which is economical to manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a partial top view of a vehicle having the snowplow of this invention mounted thereon;

FIG. 2 is a side view of the snowplow mounted on a vehicle;

FIG. 3 is a view similar to FIG. 2 except that the vehicle is being moved in a forwardly direction;

FIG. 4 is an enlarged sectional view seen along lines 4—4 of FIG. 1; and

FIG. 5 is an enlarged sectional view seen along lines 5—5 of FIG. 1.

The numeral 10 refers generally to a vehicle such as an automobile or truck having a rear axle 12 and a trailer hitch 14 at the rearward end of the vehicle. The snowplow of this invention is referred generally to by the reference numeral 16 and comprises a pair of arms 18 and 20 which are identical. Inasmuch as arms 18 and 20 are identical, only arm 20 will be described in detail.

Arm 20 has an arcuate portion 22 at its forward end having a substantially inverted U-shape. Arm 20 also includes a finger-like stop means 24 which extends downwardly and forwardly therefrom adjacent the rearward end of arcuate portion 22 as seen in FIG. 2. Arcuate portion 22 is positioned over the axle 12 as seen in FIG. 2 and it can be seen that the spacing of the element 24 and the forward end 26 of the arcuate portion 22 is such that a certain amount of "play" exists between the arm 20 and the axle 12. When the vehicle 10 is moved rearwardly, the axle 12 engages the element 24 to push the arm 20 rearwardly. When the vehicle 10 is moved forwardly, the forward end 26 of the arcuate portion 22 engages the axle 12 to pull the arm 20 forwardly. The same is true for the arm 18.

The numeral 28 designates a plow blade having a pair of brackets 30 and 32 secured to the forward side thereof adjacent the opposite lower ends thereof. The rearward end of arm 20 is secured to the bracket 32 by means of bolt assembly 34. The opening in the rearward end of arm 20, through which extends the bolt 34, is larger than the bolt 34 to permit the blade 28 and bracket 32 to move slightly with respect to the arm 20 as seen in FIG. 3.

The numeral 36 refers to an extension means which may be secured to the rearward ends of either of the arms 18 and 20 but is shown to be secured to the rearward end of arm 18 in the drawings to permit the blade 28 to be angled with respect to the direction of travel of the vehicle 10. Extension means 36 is secured at its forward end to the rearward end of arm 18 by bolt assembly 38 and is secured at its rearward end to the bracket 30 by means of bolt assembly 40. It can be seen in FIG. 5 that the openings 42 and 44 in the rearward end of extension means 36 are substantially greater than the diameter of bolt assembly 40 to permit the blade and the bracket 30 to pivot with respect to the rearward end of the extension means 36. Sleeve 46 is mounted on extension means 36 by means of pin 48 with a bar 50 extending inwardly therefrom.

A connection means 52 is secured to the forward end of blade 28 at the center thereof comprising generally a bracket 54 which is hingedly secured to the blade 28 about a horizontal axis to permit the blade 28 to pivot from the position of FIG. 2 to the position of FIG. 3. The rearward end of an L-shaped member 56 is secured to the bracket 54 by means of pin 58 as seen in FIG. 4 and it can be seen that the bracket 54 may be selectively longitudinally mounted on the rearward end of the member 56 by means of the openings 60. Member 56 includes a vertically disposed portion 62 which extends downwardly through the opening 64 in the hitch 14 and is maintained therein by means of key 66. The inner end of bar 50 is secured to the bracket 54 by means of the pin 58 extending therethrough as illustrated in FIG. 4.

Before mounting arms 18, 20 over axle 12, care should be taken to determine whether or not there are hydraulic brake lines located on the vehicle axle in a position where they might come in contact with arcuate portions 22 or elements 24 of arms 18, 20. The brake lines should be moved to the forward lower portion of the axle if they are not already in this position so as to avoid the possibility of any damage thereto.

The normal method of operation is as follows. Assuming that the vehicle has been driven into the garage in a "head-on" manner, it is extremely easy to attach the snowplow to the vehicle so that the vehicle can push the snow in a rearward manner as the vehicle is backed from the garage. The forward ends of the arms 18 and 20 are placed over the axle 12 and the member 56 is connected to the hitch 14 as previously described. The extension means 36 would have previously been connected to either of the arms 18 and 20 depending upon the direction that the snow is to be pushed. The adjustable connection of the bracket 54 and the member 56 is required since the use of the extension means 36 on either of the arms 18 and 20 causes the center of the plow to be moved with respect to the hitch 14. The vehicle is then moved rearwardly with the blade 28 pushing the snow as the vehicle is moved rearwardly. The forward movement of the vehicle causes the blade 28 to pivot from the position of FIG. 2 to the position of FIG. 3 so that the blade will ride over the snow so that the blade will drag less snow forwardly. It should be noted that the extension means 36 is optional and may not be used in some cases.

Thus it can be seen that an extremely novel snowplow has been provided for use on the rear axle of a vehicle which permits the vehicle to back out of the garage while pushing the snow from the driveway while doing so. The device is quickly and easily attached to the vehicle and is quickly and easily removed therefrom once the snow clearing operation has been completed. Thus it can be seen that the device accomplishes at least all of its stated objectives.

I claim:

1. A device of the kind described comprising:
    a vehicle having forward and rearward ends and a hitch at said rearward end thereof; said vehicle having a rear axle positioned forwardly of said hitch;
    a plow blade having upper and lower edges;
    connection means having hinge means thereon pivotally connecting said connection means to said blade for pivotal movement of said blade about a horizontal axis adjacent said upper edge of said blade;
    means detachably securing said connection means to said hitch;
    first and second spaced apart arms having forward and rearward ends, said forward ends extending above and forwardly of said rear axle and resting on said axle so as to permit said arms to move forwardly and rearwardly with respect to said axle;
    said arms each having an element thereon spaced rearwardly of said forward end, said element engaging said rearward axle at times to limit forward movement of said arms with respect to said rearward axle;
    bracket means securing said rearward ends of said arms to said plow blade at spaced points which are located below said horizontal axis.

2. A device according to claim 1 wherein said forward ends of said arms are arcuate and curve downwardly so as to engage said rear axle at times to limit rearward movement of said arms with respect to said rear axle; the distance between said arcuate ends of said arms and said elements being such that lost motion is permitted between said rear axle and said arms as said vehicle reverses its direction of movement.

3. A device according to claim 2 wherein said elements are downwardly extending fingers each terminating in a lower end, said lower ends of said fingers being spaced from said arcuate ends of said arms so as to permit said arms to be lifted upwardly out of engagement with said rearward axle.

4. A device according to claim 1 wherein said means securing said attachment means to said hitch comprises a vertically disposed opening in said hitch and a L-shaped member having a vertically disposed member extending downwardly through said opening.

5. A device according to claim 4 wherein said connection means comprises a bracket connected to said hinge means, said L-shaped member having a horizontal member, said bracket being telescoped over said horizontal member for sliding movement thereon; and locking means engaging said bracket selectively locking said bracket against sliding movement with respect to said horizontal member.

6. A device according to claim 1 wherein said blade includes opposite ends, said hinge means being connected to said blade at a point approximately equidistant from said opposite ends; said first and second arms being secured to said blade on opposite sides of said hitch means.

7. The combination of claim 1 wherein an arm extension means is detachably connected to the rearward end of one of said first and second arms and said plow blade and extends therebetween to cause the plow blade to be angularly disposed with respect to the direction of travel of the vehicle.

8. The combination of claim 7 wherein a reinforcing arm extends between said extension means and said connection means.

9. The combination of claim 1 wherein an arm extension means is detachably connected to the rearward end of one of said first and second arms and said plow blade and extends therebetween to cause the plow blade to be angularly disposed with respect to the direction of travel of the vehicle.

* * * * *